United States Patent [19]

Grosjean

[11] Patent Number: 4,634,906

[45] Date of Patent: Jan. 6, 1987

[54] MULTIPHASE MOTOR WITH MAGNETIZED ROTOR HAVING N PAIRS OF POLES WITH AXIAL MAGNETIZATION

[76] Inventor: Michel Grosjean, 1, rue des Narcisses, CH-2504 Bienne, Switzerland

[21] Appl. No.: 720,408

[22] PCT Filed: Jul. 30, 1984

[86] PCT No.: PCT/CH84/00118

§ 371 Date: Mar. 28, 1985

§ 102(e) Date: Mar. 28, 1985

[87] PCT Pub. No.: WO85/00704

PCT Pub. Date: Feb. 14, 1985

[30] Foreign Application Priority Data

Jul. 28, 1983 [CH] Switzerland .................. 4129/83

[51] Int. Cl.⁴ .......................................... H02K 37/00
[52] U.S. Cl. ................................. 310/49 R; 310/156; 310/257
[58] Field of Search ............... 310/40 MM, 49 R, 162, 310/163, 164, 213, 254, 257, 156

[56] References Cited

U.S. PATENT DOCUMENTS

| | | | |
|---|---|---|---|
| 3,989,967 | 11/1976 | Kikuyama et al. | 310/164 |
| 4,075,540 | 2/1978 | Torisawa | 318/138 |
| 4,207,483 | 6/1980 | Baer | 310/49 R |
| 4,336,471 | 6/1982 | Plancon | 310/49 R |
| 4,355,252 | 10/1982 | Lechner et al. | |
| 4,455,499 | 6/1984 | Sudlek | 310/49 R |
| 4,558,244 | 12/1985 | Nikaido et al. | 310/49 R |

FOREIGN PATENT DOCUMENTS

| | | |
|---|---|---|
| 2938771 | 4/1981 | Fed. Rep. of Germany . |
| 1238445 | 7/1960 | France . |
| 2209246 | 6/1974 | France . |
| 2283576 | 3/1976 | France . |
| 2417880 | 9/1979 | France . |
| 2435150 | 3/1980 | France . |
| 2458170 | 12/1980 | France . |
| 2518844 | 6/1982 | France . |
| 1531314 | 11/1978 | United Kingdom . |
| 1537048 | 12/1978 | United Kingdom . |
| 2014800 | 8/1979 | United Kingdom . |
| 1586056 | 3/1981 | United Kingdom . |

Primary Examiner—Patrick R. Salce
Assistant Examiner—D. Rebsch
Attorney, Agent, or Firm—Parkhurst & Oliff

[57] ABSTRACT

The motor structure is as follows:

the rotor (1) has N magnetization axes parallel to the axis of rotation of the rotor, the adjacent poles having opposite polarities;

the stator (2) forms m phases (r, s), $m = N/2n$, for n being an integer;

every phase (r, s) comprises a pair of coplanar polar pieces (3, 4) interpositioned, the one (3) in the other one (4), the polar pieces (3, 4) comprise full poles ($p_1$ to $p_4$ and $p_6$ to $p_8$) and fractional poles ($p_5$, $p_9$);

the phases (r, s) are displaced with respect to one another;

the polar pieces (3, 4) of every phase (r, s) are magnetically connected with one another by a coiled core (7).

6 Claims, 8 Drawing Figures

MULTIPHASE MOTOR WITH MAGNETIZED ROTOR HAVING N PAIRS OF POLES WITH AXIAL MAGNETIZATION

This invention relates to multiphase motors, the rotor of which has N pairs of poles with axial magnetization.

Different types of motors with magnetized rotors exist. According to the present invention the magnetization axes of the rotor is parallel to the rotation axis of the rotor.

A principal object of the invention is to create a multiphase motor with a high efficiency by using existing materials, and which is easily manufactured by industrial processes and the phase number of which, as well as the range of powers, can be very extensive without modifying the motor conception. Subsidiarily, the invention also has as its object to create a multiphase motor which can easily be adapted to the stepping mode.

The field of applications of the motor according to the invention is thus very large. This motor can particularly be used with driving systems for office automation, robots, aeronautical and space industry, photographic installations and time-keepers. More generally, the motor according to the present invention is suitable to all the systems using digital techniques, and, more particularly, to all those with which size output power and speed constitute critical criteria.

One embodiment of the motor according to the invention and two variants are represented schematically and simply by way of example in the drawings in which.

Figure 1:
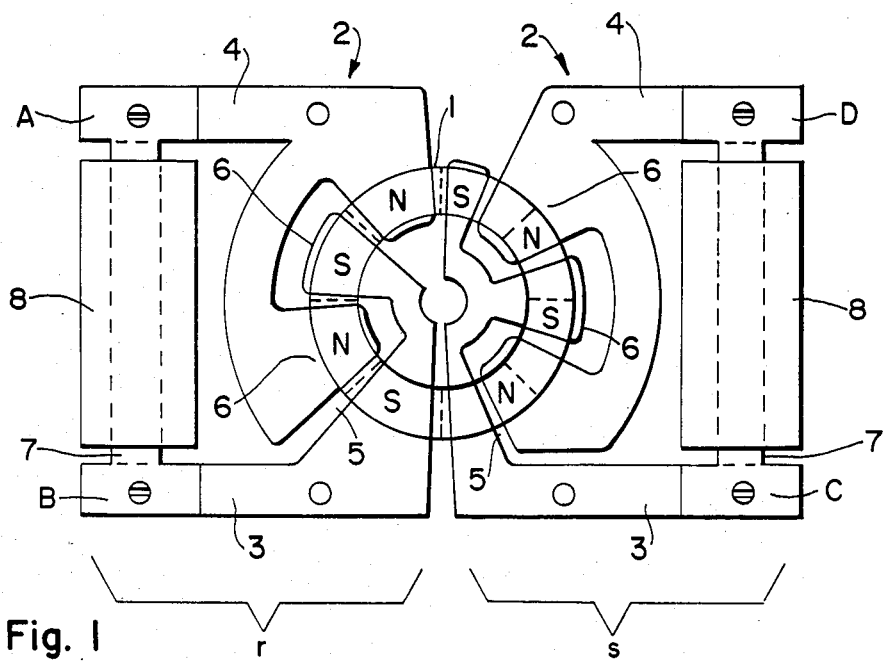
FIG. 1 is a view of that embodiment in the direction of the rotation axis of the rotor.

The motor represented in FIGS. 1 to 4 has a rotor 1 provided with a number N of pairs of poles equal to eight. The number m of the phases of this motor is equal to two. Moreover, the shifting between these two phases is equal to $2\tau/(N \cdot m)$.

The rotor 1 is of ferromagnetic material such as samarium-cobalt, the coercive force of which is high and the specific mass small. It has eight pairs of poles, the magnetization axes of which are parallel to the rotation axis of the rotor, but alternately in opposite directions, and they are regularly arranged around that axis.

The rotor 1 is mounted opposite a stator 2 which forms two phases r and s. Each phase r, s comprises two polar pieces 3, 4 coplanar, interpositional in one another, piece 3 being within piece 4. The two polar pieces 3, 4 are separated from one another by a sinuous air-gap 5 in each phase.

The polar pieces 3, 4 are of ferromagnetic material having a small coercive force and a high saturation induction. They have poles 6 (FIG. 1) which are designated by $p_1, p_2, \ldots, p_9$ in FIG. 2 to facilitate the explanation.

Figure 2:
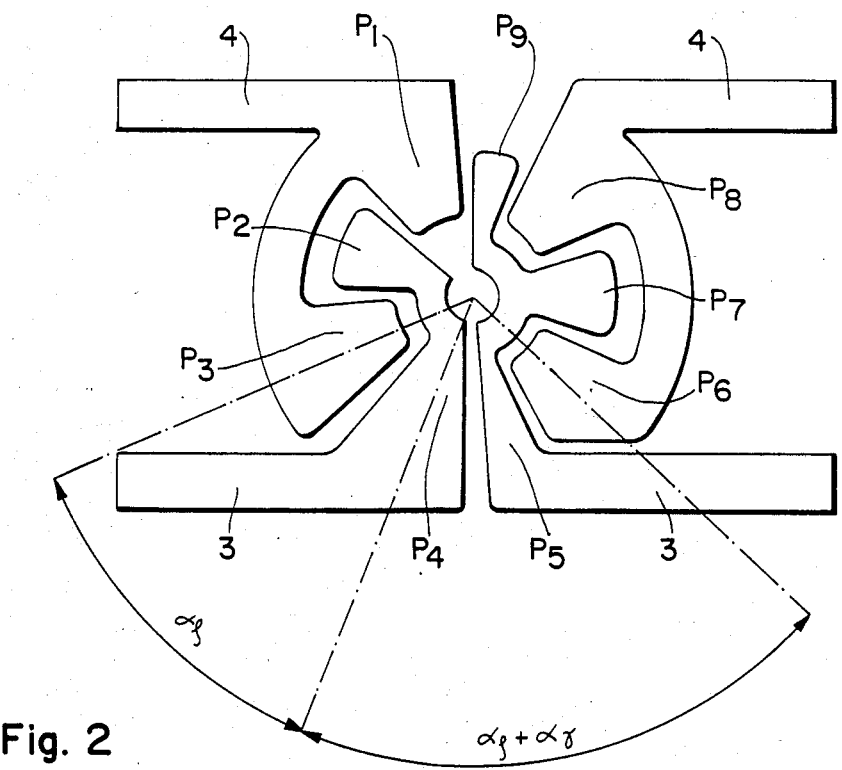
FIG. 2 is a plan view of its stator.
Figure 3:
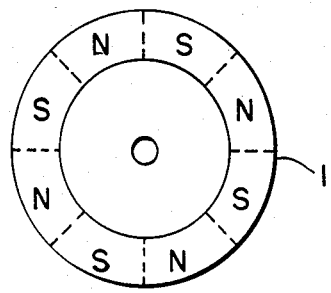
FIG. 3 is a plan view of its rotor.
Figure 4:
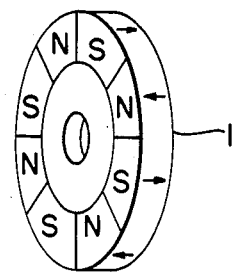
FIG. 4 is a perspective view of this rotor.

FIG. 2 shows that the poles $p_1, p_3$ of polar piece 4 of phase r, the poles $p_2, p_4$ of polar piece 3 of this same phase r, poles $p_6, p_8$ of polar piece 4 of phase s and pole $p_7$ of this same phase s have, each one, the same arc.

These different poles are called full poles, whereas poles $p_5$ and $p_9$ of polar piece 3 of phase s are fractional poles. The sum of the angular extensions of these two fractional poles is at least approximately equal to the angular extension of a full pole.

In the general case of a motor with m phases, the rotor of which has N pairs of poles, the poles of the polar pieces of $m-1$ phases and those of one polar piece of the mth phase are full; they are $\frac{1}{2}$ N/m in number per polar piece and they are arranged at an angular interval at least approximately equal to twice that between the pairs of adjacent poles of the rotor. Regarding the poles of the remaining polar piece, there are $(\frac{1}{2} N/m)-1$ which are full, whereas the m remaining poles are fractional, the sum of their arcs being at least approximately equal to the arc of a full pole.

With the embodiment represented, one of the phases r, s is displaced with respect to the other one through an angle $\alpha_\gamma$ of 22.5°. In the general case of a motor with m phases, the rotor of which has N pole pairs, $\alpha_\gamma = 2\pi/Nm$. The arc of every fractional pole is at least approximately equal to 1/m times that of a full pole.

The displacement $\alpha_\gamma$ can be made different from $2\pi/Nm$. In this case, the sum of the arcs of the fractional poles remains at least approximately equal to the arc of a full pole, but all these fractional poles no longer have the same arc.

The two polar pieces of each phase of stator 2 are magnetically connected to one another by a core 7 of ferromagnetic material having a small coercive force and a high saturation induction. A coil 8 is wound around the core of each phase.

The polar pieces 3, 4 of each phase can be positioned each one by a pin and a threaded foot (not shown). Regarding mounting the rotor 1, it is conventional. It can be journaled in bearings having a small sliding friction. Its shaft (not shown) can carry a pinion meshing with a first wheel of a wheel gear to transmit the rotor rotations to the gear.

In the first variant (FIG. 5), a disk 9 of soft ferromagnetic material is secured to the face of the rotor opposed to that facing the stator.

Figure 6:
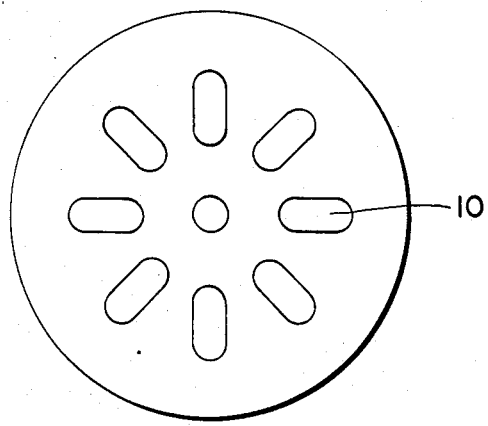
FIG. 6 is a plan view of a piece of the second variant.

In the variant of FIG. 6, the motor comprises a fixed soft ferromagnetic disk which is mounted so that the rotor will be located between that disk and the stator. That disk is provided with openings 10 which are judiciously located in order to produce a positioning torque.

Figure 7:
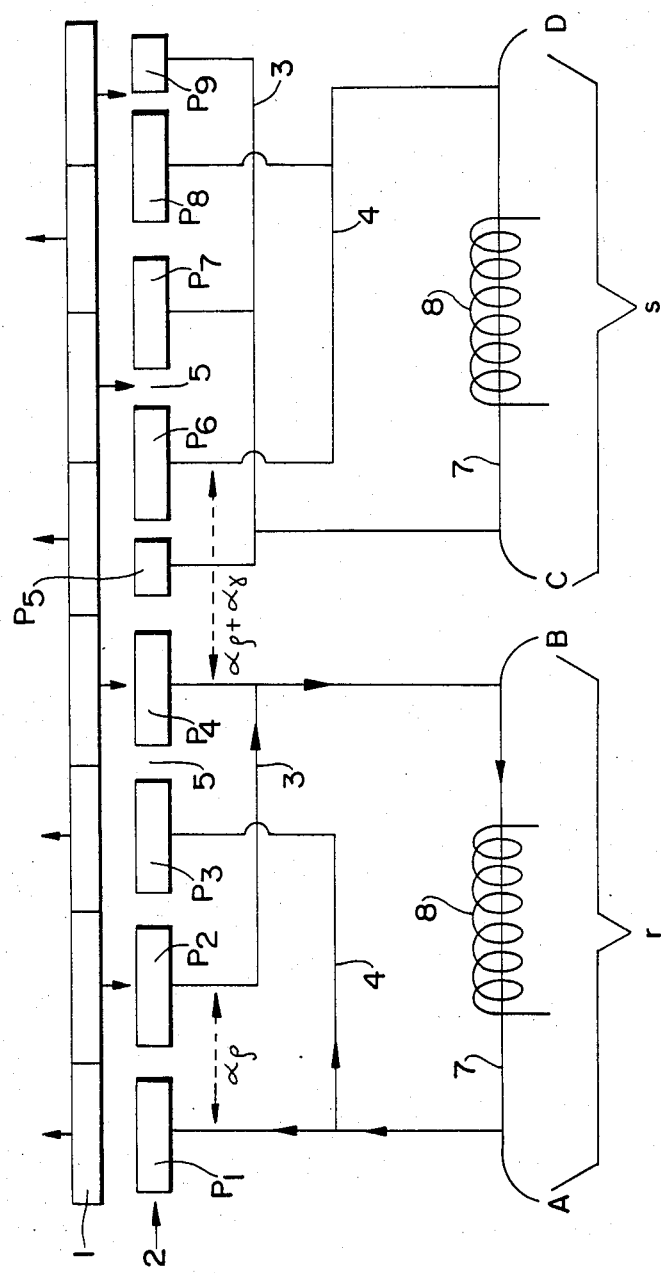
FIGS. 7 and 8 are linear unrollings of the motor which illustrate its mode of operation.
Figure 8:
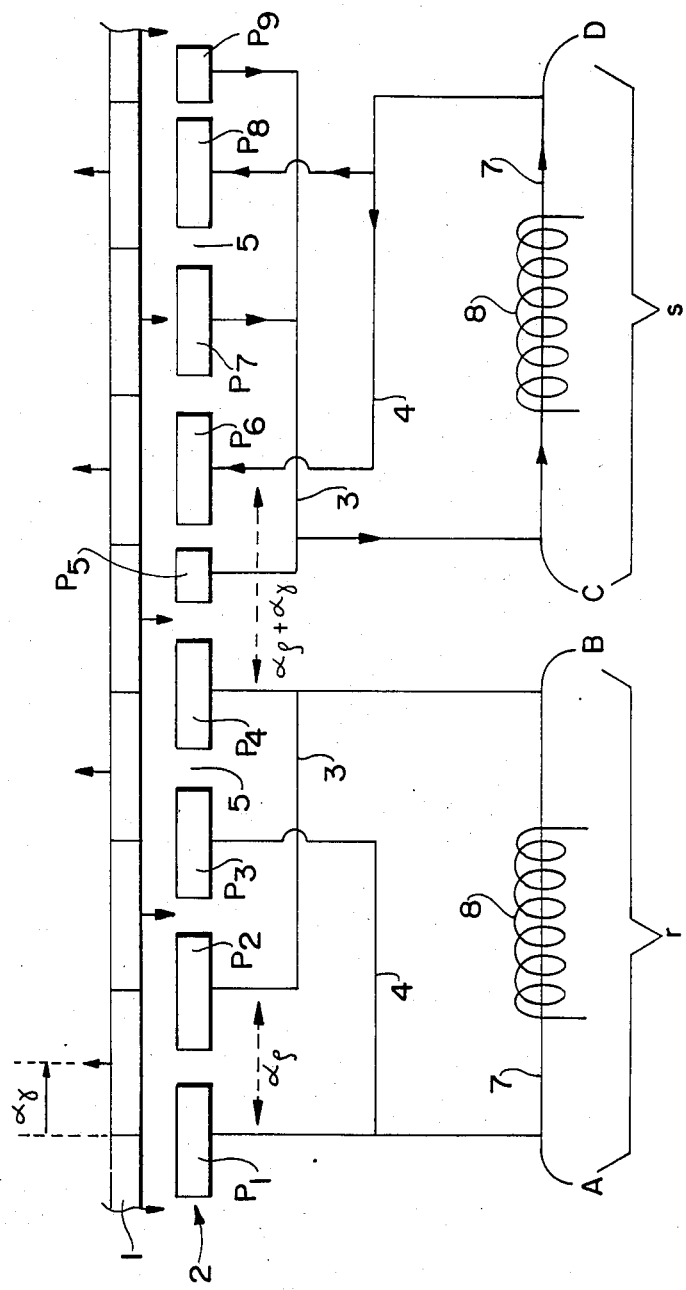

FIGS. 7 and 8 illustrate the operation of the motor. They are linear developed views thereof. More particularly, they are diagrammatic sections linearly unrolled. The shift of the phases r, s is 22.5°.

FIG. 8 shows the state of the motor when the rotor has moved through 22.5° with respect to that represented in FIG. 7, i.e., in the general case, through an angle $\alpha_\gamma = 2\pi/Nm$.

In order to facilitate understanding the operation of the motor represented, the manner to determine the characteristic curve called mutual torque is first disclosed. The mutual torque is that due to the interaction between the magnetic fluxes of the rotor and those of the coils.

In the position of FIG. 7, poles of the rotor 1 are exactly opposite poles $p_1, p_2, p_3$ and $p_4$ of phase r. That Figure shows that the rotor fluxes directed toward the stator are received by poles $p_2$ and $p_4$ of polar piece 3, from which they are directed to core 7 of phase r, through which they flow from B to A. They are then closed by passing through poles $p_1$ and $p_3$ of polar piece 4 of the stator. Regarding the rotor fluxes directed in the opposed directon, they are also received by polar piece 3 of phase r and are consequently directed along the same path as that of the first ones considered. Thus, they flow through core 7 also from B to A before they get closed. In the considered rotor position, the rotor flux through core 7 of phase r is thus maximum.

Upon moving the rotor from that position through an angle $\alpha_p$ equal to $2\pi/N$, it is easy to see that the flux through core 7 of phase r is maximum too, but in the opposite direction, i.e., it flows through this core from A to B. There is thus a reversal of the rotor flux in core 7 of phase r, every time the rotor turns through an angle equal to $2\pi/N$, of 45° in the example represented.

When the coil of phase r is driven, an interaction torque results between the coil and the magnetized rotor, the mutual torque, the period of which is equal to $4\pi/N$, and the neutral positions of which correspond to the rotor positions in which the poles of the rotor are exactly opposite the poles of the polar pieces of this phase r.

Regarding poles $p_5$, $p_6$, $p_7$, $p_8$ and $p_9$ of phase s, between which are the poles of the rotor in FIG. 7, it is easy to see that this phase s also has a mutual torque with a period of $4\pi/N$, but displaced with respect to the mutual torque of phase r through an angle $\alpha_\gamma = 2\pi/Nm$, of 22.5° in the example represented.

The rotor position in which its flux through core 7 of phase s is maximum in that of FIG. 8. The two fractional poles $p_5$ and $p_9$ each receive a flux equal to $1/m$ times the flux received by a full pole, thus ½ times that of a full pole in the presented example.

The remarks made here above with respect to an angular displacement of the phases different from $2\pi/Nm$ are applicable here too.

The motor behavior with the indicated mutual torques, when the coils are driven, is known and will not be disclosed.

The two-phase motor represented with a rotor having eight pairs of poles is obviously not the only possible embodiment of the motor according to the invention. The relation $m = N/2n$ between the number N of pole pairs of the rotor and that m of the phases, n being an integer, need only be satisfied. The following table indicates the possible configurations of the motor according to the invention.

| m | n | N |
|---|---|---|
| 2 | 1 | 4 |
| two-phase | 2 | 8 |
|   | 3 | 12 |
|   | 4 | 16 |
|   | ... | ... |
|   | ... | ... |
| 3 | 1 | 6 |
| three-phase | 2 | 12 |
|   | 3 | 18 |
|   | 4 | 24 |
|   | ... | ... |
|   | ... | ... |
| 4 | 1 | 8 |
| four-phase | 2 | 16 |
|   | 3 | 24 |
|   | 4 | 32 |
|   | ... | ... |
|   | ... | ... |
| ... | ... | ... |

Figure 5:
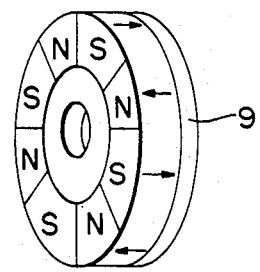
FIG. 5 is a view similar to that of FIG. 4, but relating to the first variant.

With the first variant represented in FIG. 5, the presence of the soft ferromagnetic disk 9 on the rotor has an effect to increase the flux of every pair of rotor poles by increasing the permeance from the view point of the rotor.

The fixed ferromagnetic disk of the second variant represented in FIG. 6 has an analogous effect. Moreover, it overbalances the attraction between the rotor and the stator. The openings 10 of this disk have as effect to generate a positioning torque. The openings are equal in number to that of the pole pairs of the rotor and they are regularly distributed to form a circular row concentric to the rotor. In this case, the period of the positioning torque is equal to $2\pi/N$. However, it would also be possible to generate a positioning torque with a period of $4\pi/N$ by suppressing every other opening 10.

Regarding the efficiency of the motor according to the invention and without going into the details of the theory, those skilled in the art will note that it is high.

At first, the fluxes of all the pole pairs of the rotor flow in the same direction through each coil core, because of the disclosed interpositioning of polar pieces 3, 4, of the magnetic connection provided between the two polar pieces and of the provision of full and fractional poles. There is, indeed, no pole pair of the rotor, the flux of which would be lost, i.e. would not be closed through the cores and would not contribute in additive manner to the mutual flux.

Moreover, when the motor operates stepwise, the fact that the rotor is plain, i.e. has no angular gap between the magnetization axes which would not be equal to $2\pi/N$, optimizes, from the view point of the efficiency, the relation between the total flux of the pole pairs of the rotor and the inertia of the rotor. That is due to the fact that the efficiency is a function increasing with the flux and decreasing with the inertia, but that the power to which that function increases with the flux is higher than that to which it decreases with the inertia.

The phase number of the motor according to the invention can be very great without modifying the motor concept, since it suffices that the relation $m = N/2n$ be satisfied for n being an integer. In other words, it suffices to increase the number N of pole pairs of the rotor in order to increase the number m of phases.

The motor according to the invention also has the advantage of offering a very large range of powers, without having to modify the motor concept. Without going into the details of theory, it is, indeed, intuitive to observe that the mechanical power of a motor of this type is a function increasing with the number of pole pairs of the rotor as well as with the diameter of the rotor.

The manufacture of the motor according to the invention is easy, since its stator is wholly determined in a plane.

Finally, the motor according to the invention has the advantage of being suitable to the stepping mode of operation, since the disk of FIG. 6 permits the entry of the positioning torque required by that operation mode.

I claim:

1. A multiphase motor with a magnetized rotor having N pairs of rotor poles, the axis of magnetization of each rotor pole being parallel to the axis of rotation of said rotor, wherein the magnetization axes of the rotor poles are regularly distributed around the axis of rotation of said rotor, the adjacent rotor poles having opposite polarities, wherein the rotor is mounted opposite a stator, said stator formed with m phases where $m=N/2n$, n being an integer and m being an integer greater that 1, each phase comprising two substantially coplanar polar pieces, one of which is interpositioned in the other one and being separated therefrom by a sinuous air-gap, wherein for $m-1$ phases as well as for a first polar piece of the remaining phase, the stator poles of every polar piece, being $n=N/2m$ in number, are full and spaced apart by an angular interval at least approximately two times larger than that between the adjacent rotor poles, $(N/2m)-1$ stator poles of a second polar piece of the remaining phase being full, wherein the m remaining stator poles of said second polar piece are fractional, the sum of the arcs of all fractional stator poles being at least approximately equal to the arc of a full pole, wherein the phases are phase-shifted with respect to one another, wherein the two polar pieces of every phase are magnetically connected to first and second ends, respectively, of a respective core, and wherein each core has at least one coil wound thereon.

2. A motor according to claim 1, wherein the phases are phase-shifted with respect to one another through an angle at least approximately equal to $2\pi/Nm$ and wherein the arc of every fractional pole is at least approximately equal to $1/m$ times that of a full pole.

3. A motor according to claims 1 or 2, further including a soft ferromagnetic disk fixed to the face of the rotor which is opposite that facing the stator.

4. A motor according to one of the claims 1 or 2 further including a fixed soft ferromagnetic disk located so that the rotor lies between the disk and the stator.

5. A motor according to claim 4, wherein the fixed soft ferromagnetic disk has N openings regularly distributed to form a circular now concentric to the disk.

6. A motor according to claim 4, wherein the fixed soft ferromagnetic disk has $N/2$ openings regularly distributed to form a circular row concentric to the disk.

* * * * *